(12) United States Patent
Ezaki (10) Patent No.: US 7,236,686 B2
(45) Date of Patent: Jun. 26, 2007

(54) METHOD AND APPARATUS FOR TRANSMITTING A SIGNAL, METHOD AND APPARATUS FOR RECEIVING A SIGNAL, VBI SIGNAL GENERATING APPARATUS, VIDEO SIGNAL TRANSMITTING APPARATUS, VIDEO SIGNAL PROCESSING APPARATUS, VIDEO SIGNAL RECEIVING APPARATUS, DECODING APPARATUS, AND RECORDING MEDIUM FOR RECORDING A VIDEO SIGNAL

(75) Inventor: Tadashi Ezaki, Tokyo (JP)

(73) Assignee: Sony Corporation, Tokyo (JP)

( * ) Notice: Subject to any disclaimer, the term of this patent is extended or adjusted under 35 U.S.C. 154(b) by 1163 days.

(21) Appl. No.: 09/841,845

(22) Filed: Apr. 25, 2001

(65) Prior Publication Data

US 2002/0051078 A1    May 2, 2002

(30) Foreign Application Priority Data

Apr. 27, 2000 (JP) ............................. 2000-126722

(51) Int. Cl.
- *H04N 5/91* (2006.01)
- *H04N 7/167* (2006.01)
- *G11B 15/04* (2006.01)
- *G06Q 40/00* (2006.01)

(52) U.S. Cl. ............................ 386/94; 386/95; 386/98; 386/110; 360/60; 380/201; 380/204; 705/59

(58) Field of Classification Search .................. 386/94, 386/46, 125, 126, 95, 96, 110; 348/465, 348/466, 474; 360/60; 380/201, 204; 705/59
See application file for complete search history.

(56) References Cited

U.S. PATENT DOCUMENTS

| | | | | |
|---|---|---|---|---|
| 5,418,853 A | * | 5/1995 | Kanota et al. | 380/203 |
| 5,673,357 A | * | 9/1997 | Shima | 386/94 |
| 5,710,771 A | * | 1/1998 | Ueno | 370/436 |
| 5,822,425 A | * | 10/1998 | Ezaki et al. | 386/94 |
| 6,750,917 B2 | * | 6/2004 | Yamada et al. | 348/478 |

* cited by examiner

Primary Examiner—Thai Q. Tran
Assistant Examiner—Jamie J Vent
(74) Attorney, Agent, or Firm—Finnegan, Henderson, Farabow, Garrett & Dunner, L.L.P.

(57) ABSTRACT

Additional information is transmitted by means of assigning a code to a particular scanning line in a VBI (vertical blanking interval). An initial value of a CRCC (Cyclic Redundancy Check Code) or a formula used to generate a CRCC is switched depending upon the type of additional information inserted in a data frame so that a difference in the initial value causes additional information other than CGMS-A (Copy Generation Management System-Analog) to be regarded as invalid, and thus the additional information does not cause an erroneous operation. However, CGMS-A has to be transmitted in the same manner in any country. To meet this requirement, the same initial value is used when CGMS-A is transmitted. This makes it possible to transmit data in a peculiar format without causing a problem regardless of a country in which transmission is performed. Besides, it is possible to transmit CGMS-A in the same manner regardless of the country.

45 Claims, 8 Drawing Sheets

METHOD AND APPARATUS FOR TRANSMITTING A SIGNAL, METHOD AND APPARATUS FOR RECEIVING A SIGNAL, VBI SIGNAL GENERATING APPARATUS, VIDEO SIGNAL TRANSMITTING APPARATUS, VIDEO SIGNAL PROCESSING APPARATUS, VIDEO SIGNAL RECEIVING APPARATUS, DECODING APPARATUS, AND RECORDING MEDIUM FOR RECORDING A VIDEO SIGNAL

BACKGROUND OF THE INVENTION

1. Field of the Invention

The present invention relates to a method of transmitting a video signal including a plurality of scanning lines, and more particularly to a method of transmitting a video signal in which additional information other than a video signal is transmitted using a vertical blanking interval (VBI) corresponding to an ineffective area of an image.

Specifically, the present invention relates to a video signal transmission method in which particular additional information such as copy management information or copyright protection information is transmitted using a particular scanning line in a VBI. More specifically, the present invention relates to a video signal transmission method in which a code is assigned to a particular scanning line in a VBI for transmission of additional information.

2. Description of the Related Art

In the art of information processing and information communication, it is known to insert additional information other than a content such as an image and a voice/sound into content data in such a manner that the inserted additional information does not cause impairment of the quality of the content.

An example of additional information embedded in a content is content copy management information or copyright protection information. In recent years, great advances have been made in the digital signal processing technology, the data storage technology, and the data transmission technology. As a result, recording/playback apparatuses and recording media with very small sizes have become available, and it has become possible to perform extremely high-quality data processing using an inexpensive apparatus. Accordingly, there is a great need for a technique of protecting copyright of contents.

In the case of a video content, additional information can be embedded in a non-image part such as a vertical blanking interval (VBI) of a video signal. Several techniques of embedding various kinds of additional information in a VBI of a video signal have been proposed, and some of them are practically used. Specific examples include techniques described in EIAJ-CPR1204 (video ID signal transmission method using a VBI), IEC (International Electrotechnical Commission)-61880, EDTV2, VPS, PDC, and XDS. In recent years, a technique of transmitting CGMS-A (Copy Generation Management System-Analog) describing copy management information by means of inserting it into a VBI has put to practical use. In particular, copyright protection and copyright management are important for content distributors, and thus insertion of copy management information has higher priority form them than other additional information.

Techniques of transmitting additional information by means of embedding it in an HDTV signal such as a 750P signal (noninterlaced 60-frame 750-line signal) or a 1125i signal (interlaced 60-frame 1125-line signal) are being discussed toward standardization independently in the USA and Japan.

In Japan, in preparation for starting BS digital broadcasting, specifications have been established under the leadership of EIAJ (Electronic Industries Association of Japan) and disclosed in a technical report CPR1204-2 (Video ID Signal Transmission Using a VBI). A recommendation of bit assignment associated with CGMS-A has been made by ARIB (Association of Radio Industries and Businesses).

In the USA, a similar activity to that in Japan is being performed by EIA (Electronic Industries Association). However, the standard proposed by EIA is different from that proposed in Japan. It is required that at least specifications associated with transmission of CGMS-A should be common between the USA and Japan to ensure protection of copyright of broadcasting contents in these two countries. To achieve the above requirement, the discussion is directed toward establishment of a common waveform and common assignment of CGMS-A. However, assignment associated with items other than CGMS-A will become different between the USA and Japan because of different requirements in these countries.

Even if common bit assignment associated with CGMS-A is established, a difference in assignment of the other bits may cause an erroneous operation when two devices one of which is based on the USA standard and the other on the Japanese standard are connected to each other.

The problems will be discussed in further detail below for the case of television broadcasting according to the current NTSC standard in which 525-line interlaced scanning is used.

Figure 1:
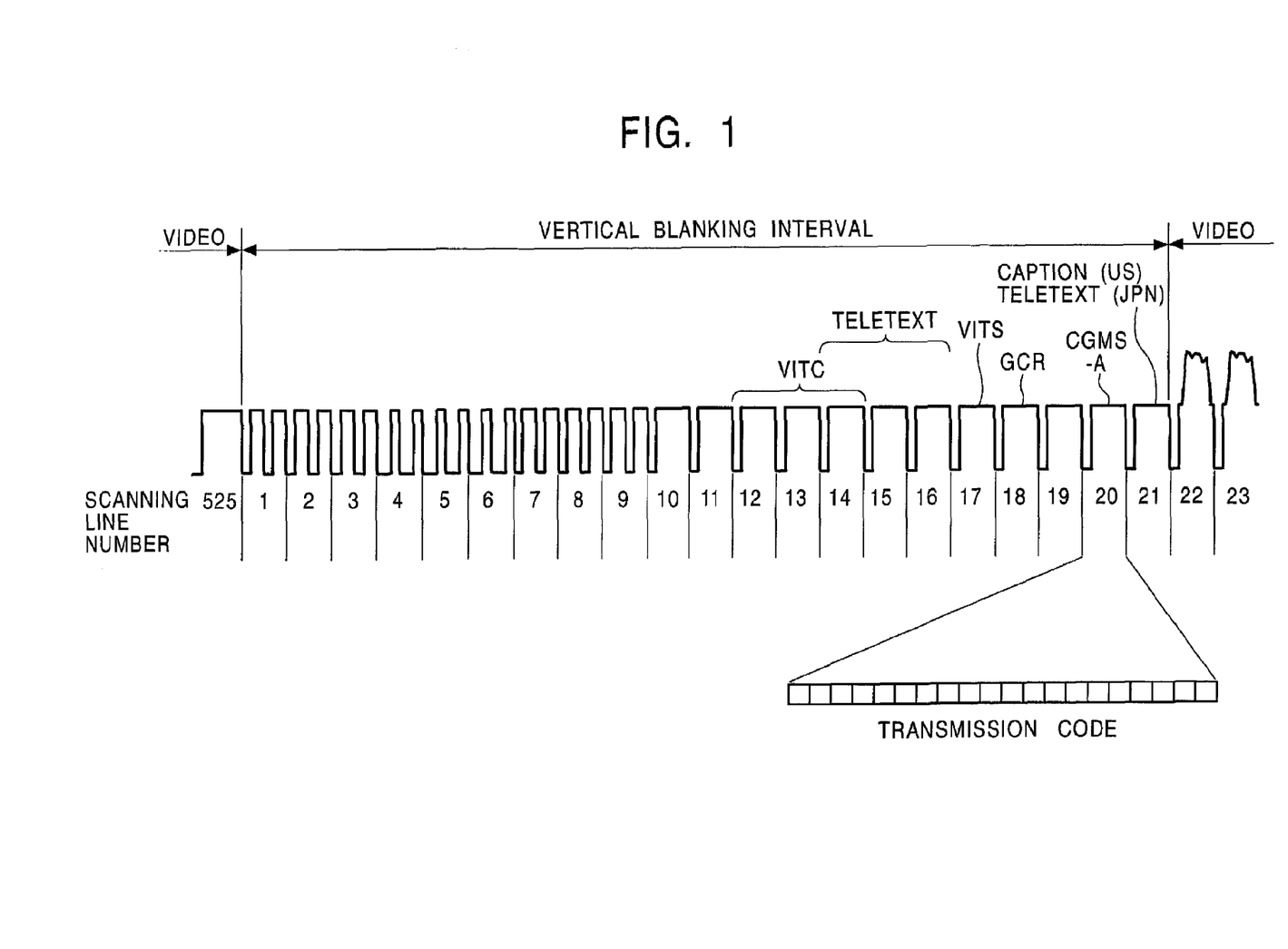
FIG. 1 is a diagram illustrating a video signal (luminance signal) in vertical blanking intervals (1st to 21st scanning lines)
Figure 2:
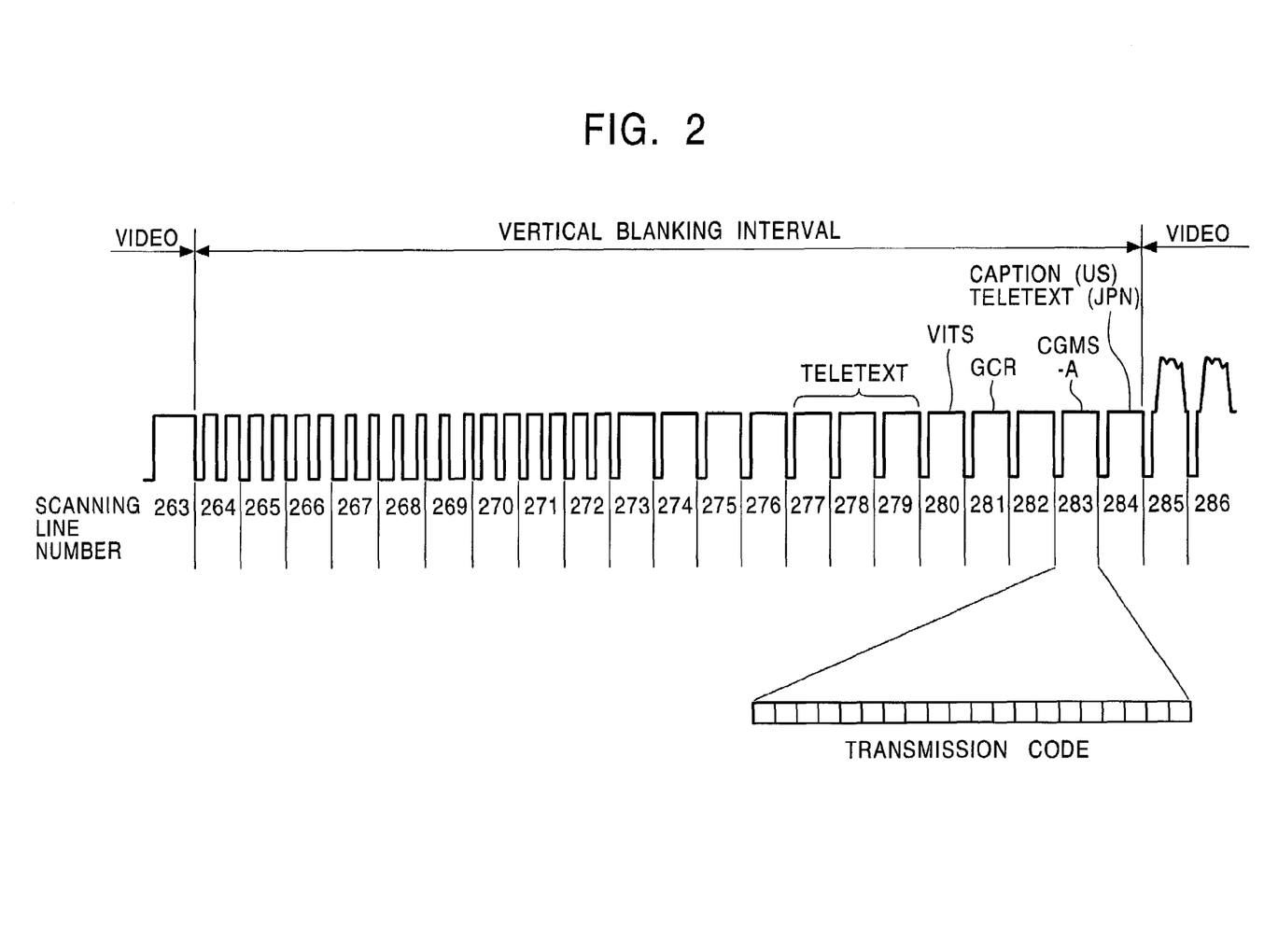
FIG. 2 is a diagram illustrating a video signal (luminance signal) in vertical blanking intervals (1st to 21st scanning lines)

In the NTSC standard, as is known, a period from 1st to 21st scanning lines and a period from 264th to 284th scanning lines of a video signal (more specifically, of a luminance signal) are respectively assigned to vertical blanking intervals (VBI). FIGS. 1 and 2 illustrate examples of bit assignment in the respective VBIs. As shown in FIGS. 1 and 2, the 20th scanning line and the 283rd scanning line are assigned to locations where CGMS-A is inserted. Basically, the same information is transmitted in the 20th and 283rd scanning lines.

Figure 3:
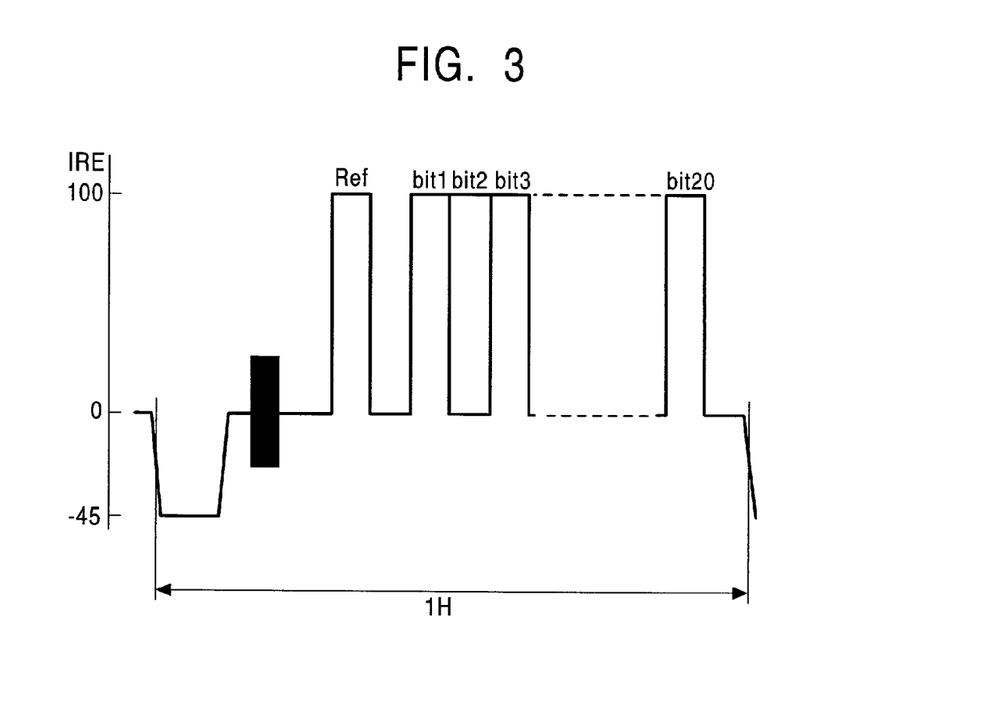
FIG. 3 is a diagram illustrating a signal waveform of a video signal (luminance signal) in 20th to 283rd lines.

FIG. 3 illustrates an example of a signal waveform transmitted in the 20th and 283rd lines. As can be seen from FIG. 3, each of these scanning lines includes an identification signal consisting of 20 bits following a reference bit.

Figure 4:
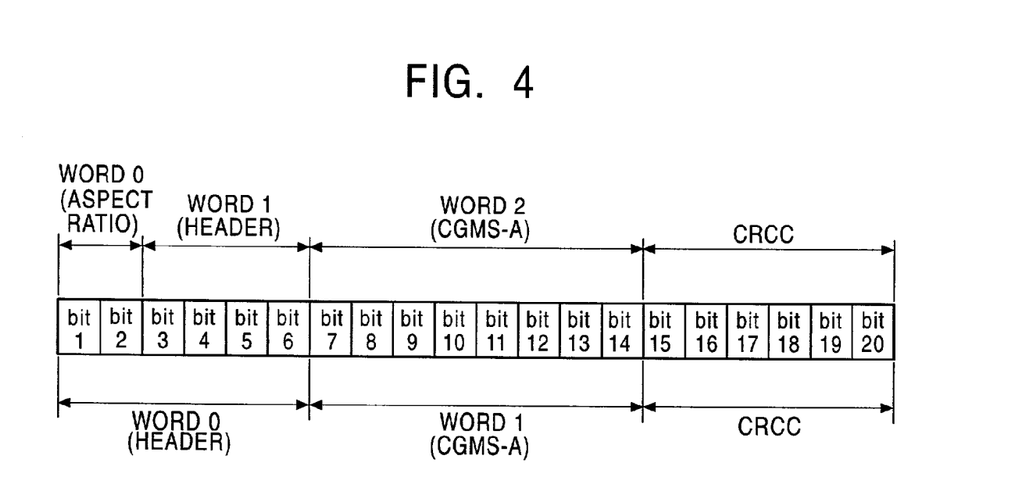
FIG. 4 is a diagram illustrating code assignment of an identification signal transmitted in the 20th and 283rd lines of a video signal (luminance signal)

In the Japanese standard, the first 2 bits of the 20-bit identification signal are assigned to WORD0, the following 4 bits to WORD1, the next 8 bits to WORD2, and the remaining 6 bits to CRCC (Cyclic Redundancy, Check Code, refer to FIG. 4). WORD0 is used to describe information about an aspect ratio, WORD1 is used to describe header information, and WORD2 is used to describe a body of data. According to the Japanese standard, when CGMS-A is described in WORD2, "0000" is described in the header or WORD1 to indicate that CGMS-A is described in WORD2.

According to the USA standard being under discussion, the first 6 bits of the 20-bit identification signal are assigned to a single word. However, to achieve compatibility associated with the bit assignment of CGMS-A, when "XX0000" is written in the first 6 bits, a word of 8 bits immediately after the first 6 bits is used to describe CGMS-A.

In the case where the 20th and 283rd lines are used to describe CGMS-A, when a video signal is produced and distributed according to the Japanese CPR-1204 standard, an aspect ration is described in the first 2 bits of the identification signal, and the first 2 bits of the identification signal are regarded, by a video playback apparatus designed and produced according to the CPR-1204 standard, as representing the aspect ratio. On the other hand, in the case where a video signal is produced and distributed according to the EIA-805 standard of the USA, information other than the aspect ratio is described in the first 2 bits of the identification signal, and video playback apparatuses designed and produced according to the EIA-8085 standard regard the first 2 bits of the identification signal as representing information other than the aspect ration. Note that the term "video playback apparatus" is used to describe a wide variety of apparatuses such as a BS digital set top box (STB), a DVD player, a video recorder, and the like.

When a video playback apparatus produced in Japan according to the CPR-1204 standard is exported to the USA and it is used to play back a video content produced or distributed in the USA, the video playback apparatus produced in Japan will treat, as the aspect ratio information, the first 2 bits of an identification signal indicating information other than the aspect ratio. As a result, an erroneous operation occurs. Conversely, when a video playback apparatus produced in the USA according to the EIA-805 standard is imported to Japan and it is used to play back a video content produced or distributed in Japan, the video playback apparatus produced in the USA will regard the aspect ration information as information other that the aspect ratio, and thus an erroneous operation occurs.

SUMMARY OF THE INVENTION

It is an object of the present invention to provide a video signal transmission method having the capability of transmitting additional information other than a video signal, using a vertical blanking interval (VBI) in which there is no image data.

It is another object of the present invention to provide a video signal transmission method having the capability of transmitting additional information associated with copy management information, copyright protection information, or similar other particular information, using a particular scanning line in a VBI.

It is still another object of the present invention to provide a video signal transmission method having the capability of assigning a particular scanning line in a VBI to a code of particular additional information.

It is still another object of the present invention to provide a video signal transmission method which allows an apparatus to correctly operate without encountering a problem even when there is a difference in assignment of a code to a particular scanning line in a VBI, for additional information other than a predetermined type of additional information.

According to a first aspect of the present invention, to achieve the above objects, there is provided a signal transmission method/apparatus for transmitting a signal including main information and various types of additional information added to the main information, comprising: a detection unit/step for detecting the type of additional information to be added; a selection unit/step for selecting a parameter associated with an error check code depending upon the detected type of the additional information; a generation unit/step for generating an error check code on the basis of the selected parameter; and a transmission unit/step for inserting the additional information with the error check code into main information and transmitting a resultant signal.

In this signal transmission method/apparatus according to the first aspect of the present invention, the main information may be a vertical blanking interval (VBI) signal of a video signal.

The additional information added to the main information may include copy management information such as CGMS-A (Copy Generation Management System-Analog).

In the detection unit/step, the type of additional information may be detected on the basis of bit assignment within a predetermined bit range of the additional information.

The error check code may be a CRCC (Cyclic Redundancy Check Code).

When the additional information is of a predetermined type, the selection step/unit may select a parameter which is common among two or more signal transmission methods.

The parameter associated with the error check code may be an initial value used in the generation of the error check code. Alternatively, the parameter associated with the error check code may be a formula for generating the error check code or may be a shift register configuration implementing the formula.

According to a second aspect of the present invention, there is provided a signal receiving method/apparatus for receiving main information including additional information with an error check code added to the main information, comprising: a receiving step/unit for receiving the video signal; an extraction step/unit for extracting additional information with an error check code from the received signal; a detection step/unit for detecting the type of additional information to be added; a selection step/unit for selecting a parameter associated with an error check code depending upon the detected type of the additional information; and a generation step/unit for generating an error check code on the basis of the selected parameter.

In this signal receiving method/apparatus according to the second aspect of the present invention, the main information may be a vertical blanking interval (VBI) signal of a video signal. The additional information added to the main information may include copy management information such as CGMS-A.

In the detection unit/step, the type of additional information may be detected on the basis of bit assignment within a predetermined bit range of the additional information.

The error check code may be a CRCC (Cyclic Redundancy Check Code).

When the additional information is of a predetermined type, the selection step/unit may select a parameter which is common among two or more signal transmission methods.

The parameter associated with the error check code may be an initial value used in the generation of the error check code. Alternatively, the parameter associated with the error check code may be a formula for generating the error check code or may be a shift register configuration implementing the formula.

According to a third aspect of the present invention, there is provided a VBI signal generating apparatus for generating a vertical blanking interval (VBI) signal to be inserted into a video signal, comprising: a timing detector for detecting the timing of inserting a VBI signal into the video signal; an error check code generator for generating an error check code for additional information added to the VBI signal; and a VBI signal generator for generating, in response to a timing detected with the timing detector, a VBI signal including additional information with an error check code, wherein the error check code generator switches a parameter used in generation of the error check code depending upon the type of the additional information.

According to a fourth aspect of the present invention, there is provided a video signal transmitting apparatus for transmitting a video signal, comprising: a timing detector for detecting the timing of inserting a VBI signal into the video signal; an error check code generator for generating an error check code for additional information added to the VBI signal; a VBI signal generator for generating a VBI signal including additional information with an error check code; a replacing unit for, in response to a timing detected by the timing detector, inserting the generated VBI signal into a video signal; and a signal distributing unit for distributing the video signal including the VBI signal inserted therein, wherein the error check code generator switches a parameter used in generation of the error check code depending upon the type of the additional information.

According to a fifth aspect of the present invention, there is provided a video signal processing apparatus for processing a video signal, comprising: a timing detector for detecting the timing of inserting a VBI signal into the video signal; an error check code generator for generating an error check code for additional information added to the VBI signal; a VBI signal generator for generating a VBI signal including additional information with an error check code; a replacing unit for, in response to a timing detected by the timing detector, inserting the generated VBI signal into a video signal; and a processing unit for processing the video signal, wherein the error check code generator switches a parameter used in generation of the error check code depending upon the type of the additional information.

According to a sixth aspect of the present invention, there is provided a video signal receiving apparatus for receiving a video signal including additional information with an error detection, comprising: a receiving unit for receiving the video signal; a timing detector for detecting the timing of extracting the additional information from the video signal; an extraction unit for, in response to the timing detected by the timing detector, extracting the additional information from the video signal; an error checking unit for checking the additional information using the error check code included in the additional information; a decoding unit for decoding the additional information depending upon the result of error checking; and a display unit for displaying the video signal on a screen in accordance with the additional information, wherein the error checking unit switches a parameter used in the error checking depending upon the type of the additional information.

According to a seventh aspect of the present invention, there is provided a decoding apparatus for decoding additional information with an error check code included in a video signal, comprising: a timing detector for detecting the timing of extracting the additional information from the video signal; an extraction unit for, in response to the timing detected by the timing detector, extracting the additional information from the video signal; an error checking unit for checking the additional information using the error check code included in the additional information; and a decoding unit for decoding the additional information depending upon the result of error checking, wherein the error checking unit switches a parameter used in the error checking depending upon the type of the additional information.

According to an eighth aspect of the present invention, there is provided a video signal processing apparatus for processing a video signal including additional information with an error check code, comprising: an input unit for inputting a video signal; a timing detector for detecting the timing of extracting the additional information from the video signal; an extraction unit for, in response to the timing detected by the timing detector, extracting the additional information from the video signal; an error checking unit for checking the additional information using the error check code included in the additional information; a decoding unit for decoding the additional information depending upon the result of error checking; and a processing unit for processing the video signal in accordance with the additional information, wherein the error checking unit switches a parameter used in the error checking depending upon the type of the additional information.

According to a ninth aspect of the present invention, there is provided a recording medium for recording a video signal, wherein the video signal includes a VBI signal inserted therein, the VBI signal including additional information with an error check code generated by applying a parameter depending upon the type of the additional information.

The additional information added to the main information may include copy management information such as CGMS-A.

The type of additional information may be determined on the basis of bit assignment within a predetermined bit range of the additional information.

The error check code may be a CRCC (Cyclic Redundancy Check Code).

When the additional information is of a predetermined type, the error check code may be generated by applying a parameter which is common among two or more signal transmission methods. The parameter associated with the error check code may be an initial value used in the generation of the error check code. Alternatively, the parameter associated with the error check code may be a formula for generating the error check code or may be a shift register configuration implementing the formula.

A technique of transmitting additional information by assigning a code to a particular scanning line in a VBI of a video signal is practically used. There are efforts in various countries over the world to establish standards associated with transmission of additional information, in which a particular code range in additional information is to be assigned to transmission of CGMS-A representing copy management information.

In the current efforts toward establishment of standards, an international consensus is that when CGMS-A is transmitted as additional information, transmission thereof is performed in an internationally common manner. However, when information other than CGMS-A is transmitted as additional information, there is no consensus to employ a common transmission scheme, and code assignment will probably be defined differently depending upon the countries and the transmission standards. A possible problem which will occur due to different code assignment for additional information other than CGMS-A is that an erroneous operation will occur when devices designed and produced according to different standards are connected to each other in a certain country or area in which a certain standard is employed.

In the present invention, to avoid the above problem due to a difference in code assignment, the parameter associated with an error check code attached to additional information is switched depending upon the type of the additional information inserted in a data frame. Herein, the term "parameter" is used to describe not only an initial value used in generation of an error check code but also a formula used to generate an error check code (or a shift register configuration implementing such a formula).

Because the initial value associated with an error check code or a formula used to generate the error check code is switched depending upon the type of additional information inserted in a data frame, additional information other than CGMS-A is regarded as invalid, and thus an erroneous operation of the above-described type does not occur. Strictly speaking, there is a certain probability that additional information other than CGMS-S is not regarded as invalid (when CRCC is described in 6 bits, the probability is 1/64). However, such a probability does not cause a significant problem in practical applications. Even in such an occurrence, the problem can be avoided by checking data over a plurality of frames.

However, copy management information such as CGMS-A has to be transmitted in the same manner regardless of the transmission standard. To meet this requirement, the same parameter is used when CGMS-A is transmitted, regardless of the transmission standard. This makes it possible to transmit additional information in a manner peculiar to a certain transmission standard without causing an error and also makes it possible to correctly transmit CGMS-S in the common manner.

Further objects, features, and advantages of the present invention will become apparent from the following description of the preferred embodiments with reference to the attached drawings.

DESCRIPTION OF THE PREFERRED EMBODIMENTS

In a video signal, there is no image in vertical blanking intervals (VBI). Therefore, various kinds of information can be added using vertical blanking intervals.

EIAJ (Electronic Industries Association of Japan) has established a standard of a technique of transmitting various kinds of information using a VBI, and has published several associated technical reports including CPR-1204 and CPR-1204-2. The technical report CPR-1204 defines a method of transmitting a video signal with an aspect ratio selected from a plurality of values in a 525-line (scanning line) system and a method of transmitting associated information. The technical report CPR-1204 also defines identification signals associated with various types of additional information and defines a method of transmitting such an identification signal. On the other hand, the technical report CPR-1204-2 is concerned with 750p and 1125i systems, and defines a method of transmitting a video signal with an aspect ratio selected from a plurality of values and a method of transmitting associated information. Furthermore, the technical report CPR-1204-2 also defines identification signals associated with various types of additional information and defines a method of transmitting such an identification signal. ("P" denotes progressive or noninterlaced scanning and "i" denotes interlaced scanning.)

In these reports, the original purpose of insertion of additional information was to transmit information representing the aspect ratio of an image. However, the standard has been modified so that CGMS-A (Copy Generation Management System-Analog), that is, information about the limitation in the number of times copies are made or information representing recording date/time can also be transmitted.

For example, for 525-line systems, the 20th and 283rd lines are assigned for transmission of CGMS-A or recording date/time (FIGS. 1 and 2).

Data transmitted in the 20th or 283rd line has a data structure in which digital data consisting of 20 bits at a 70% or 0% level is transmitted after a reference bit (FIG. 3). The firsts 2 bits of the 20-bit data are used to describe aspect ration information, the following 4 bits are used to describe header information identifying the type of information which may be one of 16 types, the next 8 bits are used to data specified by the header, and the remaining 8 bits are used to describe an error check code (CRCC) (FIG. 4). This transmission scheme is called "video ID" and is used in camcorders and television broadcasting.

IEC (International Electrotechnical Commission)-61880 describes an international standard of a technique of transmitting information for limiting copying of a video content. That is, when "0000" is described in the header information assigned to the 3rd to 6th bits of the 20-bit data code, the following 8-bit data frame is used to transmit CGMS-A representing information to manage the number of times copies are made. In this case, 2 bits in the 8-bit data frame are used to represent the copy limitation information. More specifically, "00" indicates that copying is allowed, "01" indicates that copying once is allowed, and "11" indicates that copying is prohibited. An APS trigger bit (indicating whether or not a macro vision is output in a device by which copying once is performed) or other information may also be transmitted in the 8-bit data frame.

A 6-bit error check code CRCC (Cyclic Redundancy Check Code) for checking an error is added after the data frame. The 6-bit error check code is generated by passing the 14-bit data through a shift register (or applying a code generation formula to the data), and the resultant 6-bit error check code is added to the 14-bit data. As a result, a code having a total length of 20 bits is obtained. On the other hand, in an apparatus which receives a video signal, it is determined whether or not data includes an error by checking whether the check code generated from the first 14 bits of the data is the same as the received error check code.

In EIAJ-CPR-1204-2, a formula G(x) for generating an error check code is defined as follows.

$$G(x)=x^6+x+1 \qquad (1)$$

Figure 5:
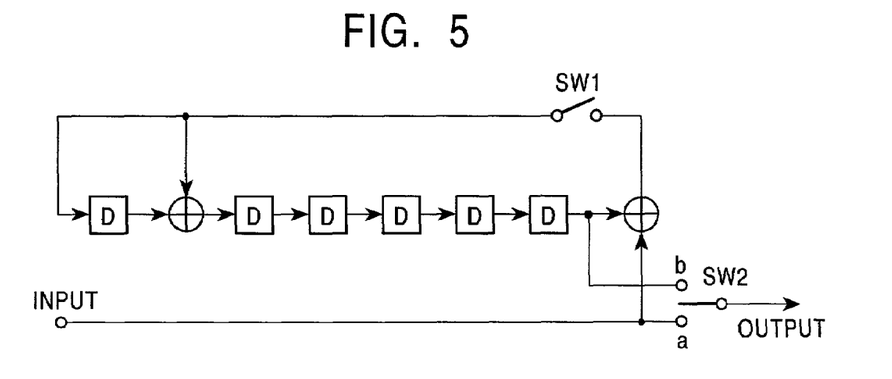
FIG. 5 is a block diagram of illustrating a shift register configuration for implementing a formula used to generate an error check code according to the standard EIAJCPR-1204-2.

The code generation formula may be implemented by a shift register such as that shown in FIG. 5. A particular initial value is set in this shift register.

In the USA, the scheme for transmitting additional information using a VBI is also under discussion. At an early stage of the discussion, an extremely different waveform was proposed. However, to meet a need for compatibility of the scheme of transmitting CGMS-A with IEC-61880, the same signal waveform is expected to be employed. This is to meet the requirement that copyright should be protected in all countries over the world, and thus copy management information or copyright protection information should be transmitted in the same manner regardless of the country.

However, information other than CGMS-A is not necessarily needed to be compatible. Information to be added varies depending upon countries or areas. From this point of view, code assignment associated with additional information other than CGMS-A will be defined differently from that defined in the technical reports CPR-1204 and CPR-1204-2 published by EIAJ (described earlier).

Possible problems, which may occur when code assignment associated with CGMS-A is different between the USA and Japan, has been discussed above in "Description of the Related Art". That is, one problem is that when a device designed and produced according to one of the USA and Japanese standards is used in the other country, an erroneous operation occurs. For example, although the first 2 bits are assigned to representation of the aspect ratio in the Japanese standard, the first 2 bits and the following 4 bits, that is, 6 bits in total are assigned to header representation in the USA standard. If a set top box (STB) produced according to the USA standard is connected to a television monitor produced according to the Japanese standard, additional information in which a header is described by the STB is regarded by the television monitor as indicating the aspect ratio, and thus the screen size is changed erroneously.

In the present invention, to avoid the above problem due to the difference in code assignment, the initial value of the CRCC is switched depending upon the type of additional information inserted in data frame.

In error checking using CRCC, if an error is detected in data itself, the data is regarded as invalid (as described earlier). The present invention makes use of this scheme to avoid the above problem. That is, the initial value of CRCC is set differently between the USA and Japan so that additional information is regarded as invalid and thus no erroneous operation occurs.

More specifically, when a set top box (STB) produced according to the USA standard is connected to a television monitor produced according to the Japanese standard, a difference in initial value causes additional information to be regarded as invalid, and thus the additional information does not cause an erroneous operation. However, CGMS-A has to be transmitted in the same manner in the USA and Japan. Therefore, when CGMS-A is transmitted (that is, only when the first 6 bits of the 20-bit code of the additional information are XX0000), the same initial value is used.

This makes it possible to transmit different data without generating an error in any apparatus based on the USA or Japanese standard and also possible to transmit CGMS-A in the same manner.

In the Japanese standard, the first 2 bits of the 20-bit code are assigned to description of aspect ratio, the following 4 bits to a header, the next 8 bits to a data frame, and the remaining 6 bits to CRCC. In contrast, in the USA standard, the first 6 bits are assigned to a header, the following 8 bits to a data frame, and the remaining 6 bits to CRCC (as described earlier).

Figure 6:
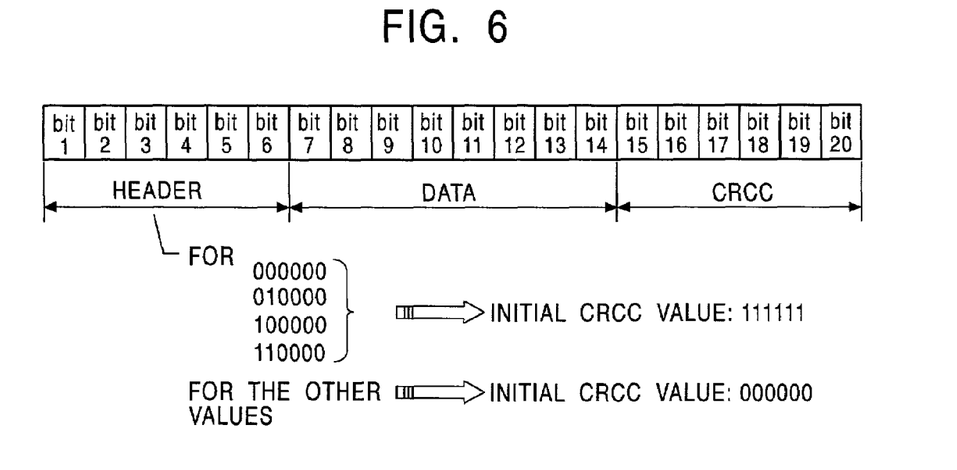
FIG. 6 is a diagram illustrating an example of a recommended formatting of additional information, employed in the USA.

For example, code assignment, that is, formatting of additional information is performed such that when XX0000 is described in a header in the USA, the initial value of CRCC is set to "1" for all bits, while all bits are set to "0" in the other cases (FIG. 6).

Therefore, a decoder according to the Japanese standards CPR-1204 and 1204-2 can obtain a correct result in decoding if the initial value of CRCC is set to "1" for all bits. On the other hand, in the case of a device according to the USA standard, if the first 6 bits of the 20-bit code including additional information are XX0000, the initial value of CRCC is set to "1" for all bits in calculation of CRCC, while all bits are set to "0" in the other cases. This makes it possible to correctly decode CGMS-A in accordance with the common scheme and also makes it possible to correctly decode additional information other than CGMS-A in accordance with a particular scheme depending upon the country or area.

In summary, in the present invention, additional information is transmitted in a common manner only when CGMS-A is transmitted, while information other than CGMS-A may be transmitted in a different manner depending upon the country/area or the standard.

Although in the above description, the initial value of CRCC is switched depending upon the type of additional information, the purpose may also be achieved by another switching method. For example, the formula used to generate CRCC or the shift register configuration may be switched.

For example, the formula used to generate CRCC may be switched from the formula (1) described above to a formula shown below, depending upon the type of the additional information.

$$G(x)=x^6+x^2+x+1 \qquad (2)$$

Figure 7:
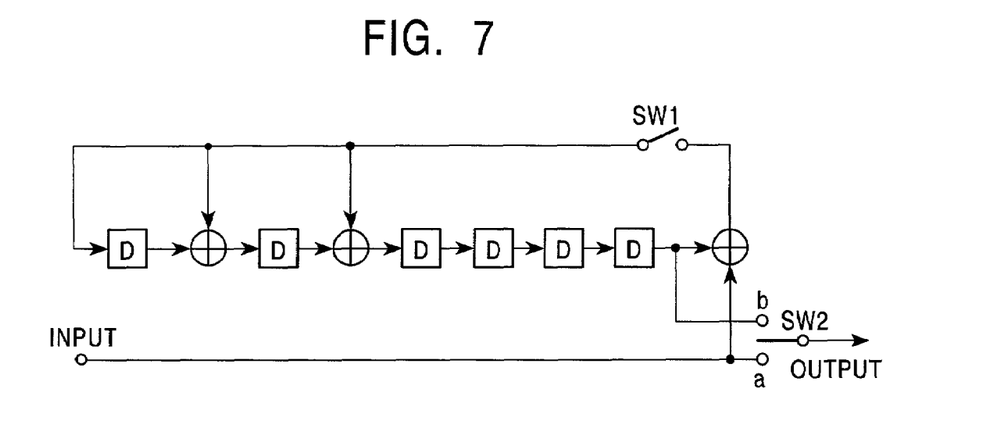
FIG. 7 is a block diagram illustrating a shift register configuration for implementing a CRCC generation formula.

FIG. 7 illustrates an example of a shift register configuration for implementing the CRCC generating formula (2).

The present invention is described in further detail below with reference to specific embodiments in conjunction with the accompanying drawings.

Figure 8:
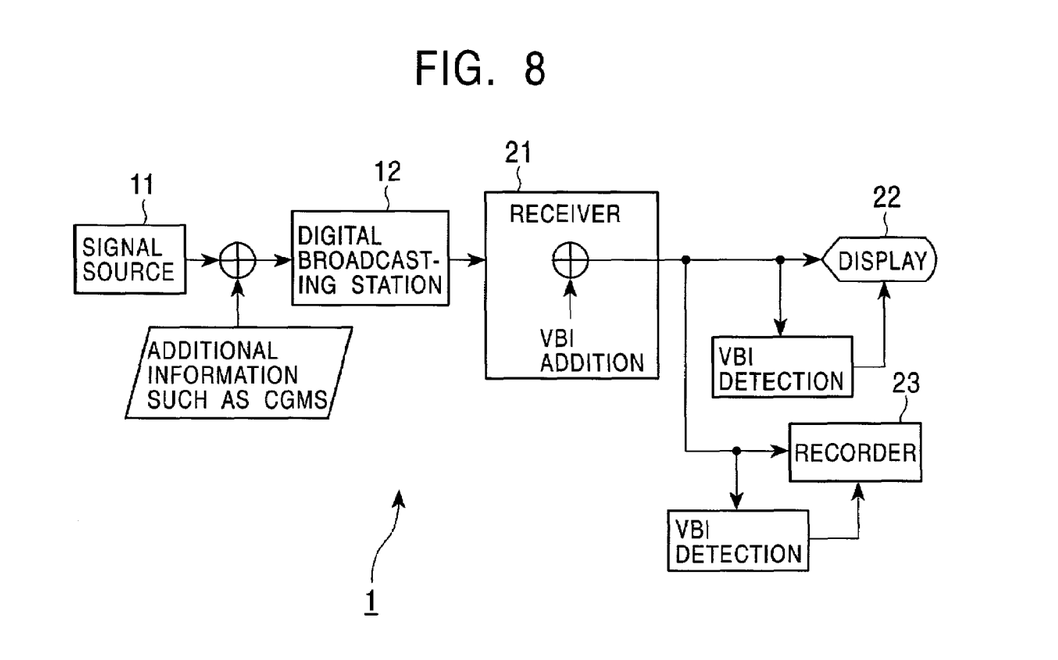
FIG. 8 is a diagram illustrating a transmission system capable of transmitting additional information according to the present invention.

FIG. 8 is a diagram illustrating a video signal transmission system 1 according to an embodiment of the present invention. This transmission system 1 is capable of transmitting a video signal including additional information added thereto. Respective parts of this transmission system 1 are described below.

The transmission system 1 includes apparatuses located at a broadcasting station for broadcasting a digital broadcasting program and apparatuses at a receiving end where a received broadcasting content is displayed on a display such as a television set or recorded by a video recorder or the like.

At the digital broadcasting station 12, additional information such as CGMS-A (copy management information) is inserted in a video signal supplied from a signal source 11, and a resultant signal is broadcasted via a broadcasting wave in a predetermined format.

In the receiver 21, a VBI is added to a received video signal. A display 22 such as a television set displays the video signal in accordance with the additional information inserted in the VBI signal. A recorder 23 such as a video recorder records the video signal in accordance with the additional information inserted in the VBI signal.

Figure 9:
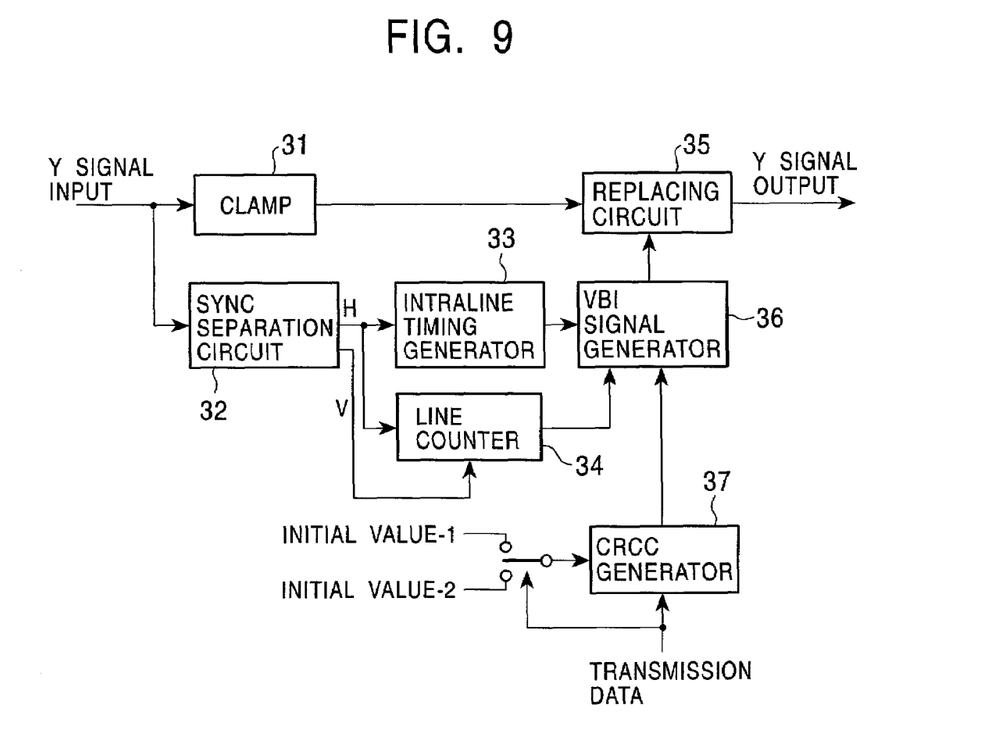
FIG. 9 is a block diagram illustrating the details of a VBI inserter circuit, in a video signal transmission apparatus, for inserting a VBI in a Y signal (luminance signal)

FIG. 9 illustrates the details of an VBI inserter circuit for inserting a VBI into a Y signal (luminance signal) at a video signal transmitting station (such as a broadcasting station). The operation of the VBI inserter circuit is described below with reference to FIG. 9.

A Y signal in a video signal is input to a clamp circuit 31 and a sync separation circuit 32. The Y signal input to the clamp circuit 31 is clamped at a predetermined level, and the resultant signal is supplied to a replacing circuit 36.

The sync separation circuit 32 extracts a horizontal synchronization signal H and a vertical synchronization signal V from the Y signal.

The horizontal synchronization signal H is supplied to an intraline timing generator 33. An intraline timing signal generated by the intraline timing generator 33 is supplied to a VBI signal generator 36. The horizontal synchronization signal H and the vertical synchronization signal V are also supplied to a line counter 34. The line counter 34 counts the number of lines. A count signal generated by the line counter 34 is supplied to the VBI signal generator 36.

A CRCC generator 37 generates an error check code CRCC (described above) used when additional information is inserted in a particular scanning line of a VBI. The CRCC generator 37 is formed of a shift register configured to implement a particular CRCC generating formula. That is, when 14-bit additional information to be transmitted is input to the CRCC generator 37, the CRCC generator 37 generates a 6-bit CRCC by passing the received 14 bits through the shift register. A resultant 20-bit data including the original 14-bit additional information and the 6-bit CRCC added thereafter is supplied to the VBI signal generator 36.

An initial value is set in the shift register of the CRCC generator 37. In the present embodiment, two initial values are prepared, that is, a first initial value all bits of which are "1" and a second initial value all bits of which are "0". When the first 6 bits of the transmission data are XX0000 (that is, when copy management information CGMS-A is transmitted as the additional information), the first initial value is supplied to the CRCC generator 37, while the second initial value is supplied to the CRCC generator 37 in the other cases.

The VBI signal generator 36 serves to generate a VBI signal including additional information. The VBI signal generator 36 determines when to insert a VBI signal on the basis of the interline timing and the line counter value, and supplies a VBI signal including additional information to a replacing circuit 35.

Instead of switching the initial value given to the CRCC generator 37, the CRCC generating formula used by the CRCC generator 37 to generate CRCC or the shift register which implements the CRCC generating formula may be switched.

In the latter case, when the first 6 bits of the transmission data are XX0000 (that is, when copy management information CGMS-A is transmitted as the additional information), the CRCC generating formula (1) or the shift register (FIG. 5) implementing this CRCC generating formula (1) is used to generate CRCC. In the other cases, the CRCC generating formula (2) or the shift register (FIG. 7) implementing this CRCC generating formula (2) is used to generate CRCC.

A video signal receiving apparatus according to an embodiment is described below. The video signal receiving apparatus according to the present embodiment is capable of correctly decoding additional information when a predetermined type of information such as CGMS-A is described in the additional information and also capable of avoiding an incorrect operation when another type of information is described in a different format in the additional information inserted in a VBI signal.

Figure 10:
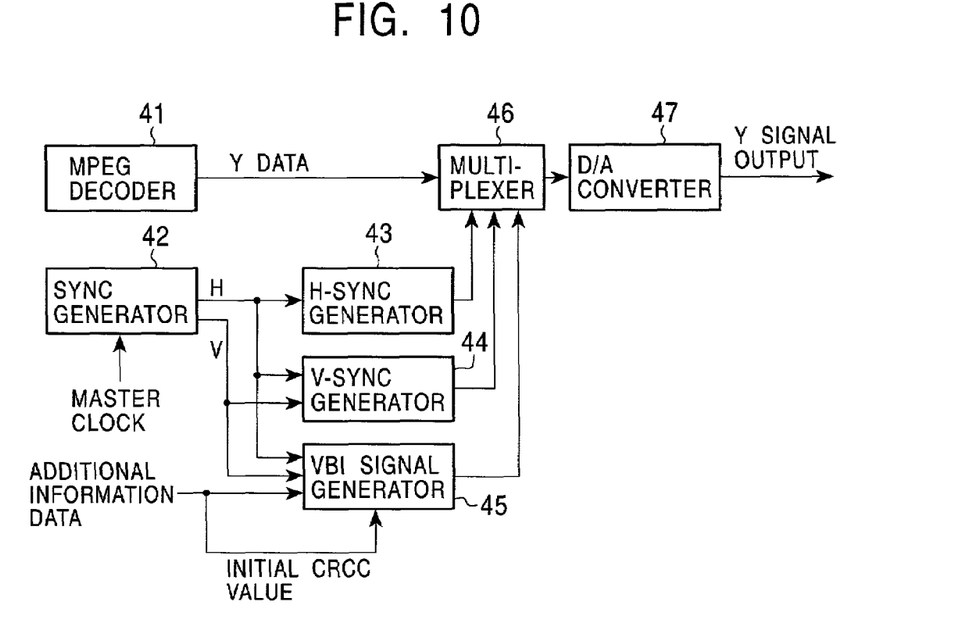
FIG. 10 is a block diagram illustrating the details of a VBI signal generator, in a video signal receiving apparatus (for example, a set top box), for generating a VBI signal.

FIG. 10 illustrates the details of a VBI signal generator in the video signal receiving apparatus (for example, a set top box), for generating a VBI signal. The operation of the VBI signal generator is described below with reference to FIG. 10.

A sync generator 42 generates a horizontal synchronization signal H and a vertical synchronization signal V in synchronization with a master clock signal. The resultant horizontal synchronization signal H and the vertical synchronization signal V are respectively supplied to an H-sync generator 43 and a V-sync generator 44.

The H-sync generator 43 generates a horizontal synchronization waveform H-sync in synchronization with the horizontal synchronization signal H. The generated horizontal synchronization waveform H-sync is supplied to a multiplexer 46. The V-sync generator 44 generates a vertical synchronization waveform V-sync on the basis of the horizontal synchronization signal H and the vertical synchronization signal V. The generated vertical synchronization waveform V-sync is supplied to the multiplexer 46.

In addition to the horizontal synchronization signal H and the vertical synchronization signal V, additional information data (14-bit data which does not include CRCC) is also supplied to the VBI signal generator 45. The VBI signal generator 45 generates a VBI signal waveform and supplies it to the multiplexer 46.

The multiplexer 46 multiplexes Y (luminance) data output from a MPEG (Moving Picture Experts Group) decoder 41, H-sync, V-sync, and VBI waveforms. A D/A converter 47 converts the multiplexed signal into an analog signal and outputs it as a decoded Y signal.

Figure 11:
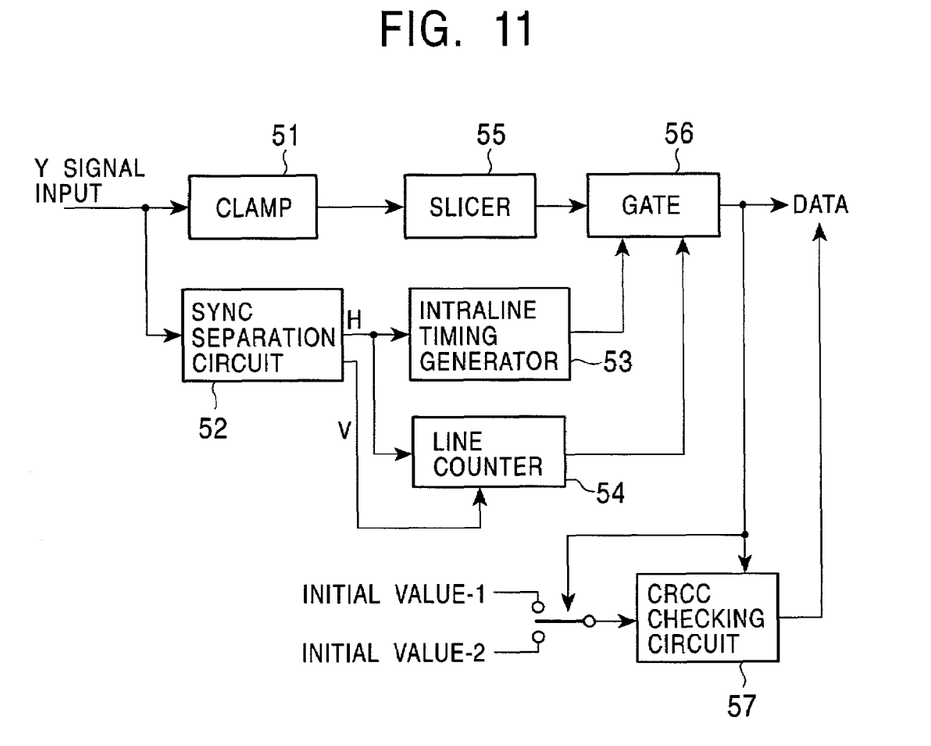
FIG. 11 is a block diagram illustrating the details of a decoder, in a video signal receiving apparatus (for example, a set top box), for interpreting additional information inserted in a VBI signal.

FIG. 11 illustrates the details of a decoder for decoding additional information inserted in a VBI signal from a Y signal. The operation of the decoder is described below with reference to FIG. 11.

A Y signal of a video signal in which VBIs are inserted is input to a clamping circuit 51 and a sync separation circuit 52.

The Y signal input to the clamping circuit 51 is clamped at a predetermined level and sliced by a slicer 55 at a predetermined level. The resultant signal is supplied to a gate circuit 56.

On the other hand, the sync separation circuit 52 extracts a horizontal synchronization signal H and a vertical synchronization signal V from the Y signal.

The horizontal synchronization signal H is supplied to an intraline timing generator 53. An intraline timing signal generated by the intraline timing generator 53 is supplied to the gate circuit 56. The horizontal synchronization signal H and the vertical synchronization signal are also supplied to a line counter 54 and the number of lines is counted. An obtained count signal is supplied to the gate circuit 56.

The gate circuit 56 determines when to extract a VBI signal on the basis of the intraline timing and the line counter value, and extracts the VBI signal including transmission data from the Y signal. The extracted signal is supplied to a CRCC checking circuit 57.

The CRCC checking circuit 57 serves to check whether the additional information included as the transmission data in the VBI signal has an error. The CRCC checking circuit 57 is formed of a shift register implementing a predetermined CRCC generating formula. More specifically, the CRCC checking circuit 57 passes the first 14 bits of the 20-bit additional information data through the shift register thereby generating a 6-bit CRCC. The CRCC checking circuit 57 then determines whether there is an error by checking whether the generated 6-bit CRCC is equal to the 6-bit data at the end of the additional information data.

An initial value is set in the shift register of the CRCC generator 57. In the present embodiment, two initial values are prepared, that is, a first initial value all bits of which are "1" and a second initial value all bits of which are "0". When the first 6 bits of the transmission data are XX0000 (that is, when copy management information CGMS-A is transmitted as the additional information), the first initial value is supplied to the CRCC generator 57, while the second initial value is supplied to the CRCC generator 57 in the other cases.

This scheme allows CGMS-A to be correctly decoded if it is described as additional information in transmission data, unless the data itself includes an error, and also allows additional information other than CGMS-A to be treated as invalid data thereby preventing the additional information from causing the apparatus to erroneously operate.

As can be seen from the above description, the present invention provides great advantages. That is, the present invention provides a video signal transmission method having the capability of transmitting additional information other than a video signal, using a vertical blanking interval (VBI) in which no image data is included.

The present invention also provides a video signal transmission method having the capability of transmitting additional information associated with copy management information, copyright protection information, or similar other particular information, using a particular scanning line in a VBI.

Furthermore, the present invention provides a video signal transmission method having the capability of assigning a particular scanning line in a VBI to a code of particular additional information.

The present invention also provides a video signal transmission method which allows an apparatus to correctly operate without encountering a problem even when there is a difference in assignment of a code in a particular scanning line in a VBI, for additional information other than a predetermined particular type of additional information.

In the present invention, to avoid a possible problem due to a difference in a manner in which code assignment of additional information to scanning lines is defined differently between the USA and Japanese standards, the initial value of CRCC or the formula for generating CRCC is switched depending upon the type of additional information inserted in a data frame so that the difference in initial value causes additional information to be regarded as invalid, and thus the additional information does not cause an erroneous operation. However, CGMS-A has to be transmitted in the same manner in the USA and Japan. To meet the above requirement, the same initial value is used only when CGMS-A is transmitted. Thus, data in a peculiar format can be transmitted without causing an apparatus to erroneously operate regardless the apparatus is used in the USA or Japan. Besides, CGMS-A can be transmitted in the same manner in any country.

According to the present invention, as described above, a data series in a particular format which may vary depending upon the country or area can be transmitted in any country or area without having to change the data structure or the signal waveform and without causing an apparatus to erroneously operate owing to a difference in data format.

More specifically, in the present invention, the same parameter (for example, the same initial value of CRCC or the same formula used to generate CRCC) is employed only when particular bits have a particular combination of bit values (that is, only when CGMS-A is transmitted) thereby allowing a particular type of information to be transmitted in the same manner. The present invention can be easily practiced only by partially modifying a definition in a video signal transmission standard. In the case where an initial value of CRCC is modified, it is not needed to modify the circuit configuration, and thus the invention can be easily implemented at low cost.

The present invention has been described in detail above with reference to specific embodiments. It will be obvious to those skilled in the art that various changes and modifications may be made without departing from the scope of the present invention as defined in the appended claims. That is, the embodiments have been described by way of example and the invention is not limited to those embodiments.

What is claimed is:

1. A signal transmission method for transmitting a signal including main information and various types of additional information added to said main information, comprising the steps of:
   detecting the type of additional information to be added;
   selecting a parameter associated with an error check code based on the detected type of the additional information;
   generating an error check code on the basis of said selected parameter; and
   inserting the additional information with said error check code into main information and transmitting a resultant signal.

2. A signal transmission method according to claim 1, wherein said main information is a vertical blanking interval (VBI) signal of a video signal.

3. A signal transmission method according to claim 1, wherein said additional information added to the main information includes copy management information.

4. A signal transmission method according to claim 1, wherein in said detection step, the type of additional information is detected on the basis of bit assignment within a predetermined bit range of the additional information.

5. A signal transmission method according to claim 1, wherein said error check code is a Cyclic Redundancy Check Code (CRCC).

6. A signal transmission method according to claim 1, wherein when the additional information is of a predetermined type, said selection step selects the parameter which is common among two or more signal transmission methods.

7. A signal transmission method according to claim 1, wherein said parameter associated with the error check code is an initial value used in the generation of the error check code.

8. A signal transmission method according to claim 1, wherein said parameter associated with the error check code is a formula for generating the error check code or is a shift register configuration implementing said formula.

9. A signal transmission apparatus for transmitting a signal including main information and various types of additional information added to said main information, comprising:
- a detection unit for detecting the type of additional information to be added;
- a selection unit for selecting a parameter associated with an error check code based on the detected type of the additional information;
- a generation unit for generating an error check code on the basis of said selected parameter; and
- a transmission unit for inserting the additional information with said error check code into main information and transmitting a resultant signal.

10. A signal transmission apparatus according to claim 9, wherein said main information is a vertical blanking interval (VBI) signal of a video signal.

11. A signal transmission apparatus according to claim 9, wherein said additional information added to the main information includes copy management information.

12. A signal transmission apparatus according to claim 9, wherein said detection unit detects the type of additional information on the basis of bit assignment within a predetermined bit range of the additional information.

13. A signal transmission apparatus according to claim 9, wherein said error check code is a Cyclic Redundancy Check Code (CRCC).

14. A signal transmission apparatus according to claim 9, wherein when the additional information is of a predetermined type, said selection unit selects the parameter which is common among two or more signal transmission methods.

15. A signal transmission apparatus according to claim 9, wherein said parameter associated with the error check code is an initial value used in the generation of the error check code.

16. A signal transmission apparatus according to claim 9, wherein said parameter associated with the error check code is a formula for generating the error check code or is a shift register configuration implementing said formula.

17. A signal receiving method for receiving main information including additional information with an error check code added to said main information, comprising the steps of:
- receiving a signal;
- extracting additional information with an error check code from the received signal;
- detecting the type of said additional information;
- selecting a parameter associated with the error check code based on the detected type of the additional information; and
- checking the additional information using the error check code on the basis of said selected parameter.

18. A signal receiving method according to claim 17, wherein said main information is a vertical blanking interval (VBI) signal of a video signal.

19. A signal receiving method according to claim 17, wherein said additional information added to the main information includes copy management information.

20. A signal receiving method according to claim 17, wherein in said detection step, the type of the additional information is detected on the basis of bit assignment within a predetermined bit range of the additional information.

21. A signal receiving method according to claim 17, wherein said error check code is a Cyclic Redundancy Check Code (CRCC).

22. A signal receiving method according to claim 17, wherein when the additional information is of a predetermined type, said selection step selects the parameter which is common among two or more signal transmission methods.

23. A signal receiving method according to claim 17, wherein said parameter associated with the error check code is an initial value used in generation of the error check code.

24. A signal receiving method according to claim 17, wherein said parameter associated with the error check code is a formula for generating the error check code or is a shift register configuration implementing said formula.

25. A signal receiving apparatus for receiving main information including additional information with an error check code added to said main information, comprising:
- a receiving unit for receiving a signal;
- an extraction unit for extracting additional information with an error check code from the received signal;
- a detection unit for detecting the type of the additional information;
- a selection unit for selecting a parameter associated with the error check code based on the detected type of the additional information; and
- a checking unit for checking the additional information using the error check code on the basis of said selected parameter.

26. A signal receiving apparatus according to claim 25, wherein said main information is a vertical blanking interval (VBI) signal of a video signal.

27. A signal receiving apparatus according to claim 25, wherein said additional information added to the main information includes copy management information.

28. A signal receiving apparatus according to claim 25, wherein said detection unit detects the type of the additional information on the basis of the bit assignment within a predetermined bit range of the additional information.

29. A signal receiving apparatus according to claim 25, wherein said error check code is a Cyclic Redundancy Check Code (CRCC).

30. A signal receiving apparatus according to claim 25, wherein when the additional information is of a predetermined type, said selection unit selects the parameter which is common among two or more signal transmission methods.

31. A signal receiving apparatus according to claim 25, wherein said parameter associated with the error check code is an initial value used in generation of the error check code.

32. A signal receiving apparatus according to claim 25, wherein said parameter associated with the error check code is a formula for generating the error check code or is a shift register configuration implementing said formula.

33. A VBI signal generating apparatus for generating a vertical blanking interval (VBI) signal to be inserted into a video signal, comprising:
- a timing detector for detecting the timing of inserting a VBI signal into the video signal;
- an error check code generator for generating an error check code for additional information added to the VBI signal; and
- a VBI signal generator for generating, in response to a timing detected with said timing detector, a VBI signal including additional information with an error check code,
- wherein said error check code generator switches a parameter used in generation of the error check code based on the type of the additional information.

34. A video signal transmitting apparatus for transmitting a video signal, comprising:
- a timing detector for detecting the timing of inserting a vertical blanking interval (VBI) signal into the video signal;

an error check code generator for generating an error check code for additional information added to the VBI signal;

a VBI signal generator for generating the VBI signal including additional information with the error check code;

a replacing unit for, in response to the timing detected by said timing detector, inserting the generated VBI signal into the video signal; and a signal distributing unit for distributing the video signal including the VBI signal inserted therein, wherein said error check code generator switches a parameter used in generation of the error check code based on the type of the additional information.

35. A video signal processing apparatus for processing a video signal, comprising:

a timing detector for detecting the timing of inserting a vertical blanking interval (VBI) signal into the video signal;

an error check code generator for generating an error check code for additional information added to the VBI signal;

a VBI signal generator for generating the VBI signal including additional information with the error check code;

a replacing unit for, in response to the timing detected by said timing detector, inserting the generated VBI signal into the video signal; and a processing unit for processing the video signal, wherein said error check code generator switches a parameter used in generation of the error check code based on the type of the additional information.

36. A video signal receiving apparatus for receiving a video signal including additional information with an error detection, comprising:

a receiving unit for receiving the video signal;

a timing detector for detecting the timing of extracting the additional information from the video signal;

an extraction unit for, in response to the timing detected by said timing detector, extracting the additional information from the video signal;

an error checking unit for checking the additional information using the error check code included in the additional information;

a decoding unit for decoding the additional information based on the result of error checking; and a display unit for displaying the video signal on a screen in accordance with the additional information, wherein said error checking unit switches a parameter used in the error checking based on the type of the additional information.

37. A decoding apparatus for decoding additional information with an error check code included in a video signal, comprising:

a timing detector for detecting the timing of extracting the additional information from the video signal;

an extraction unit for, in response to the timing detected by said timing detector, extracting the additional information from the video signal;

an error checking unit for checking the additional information using the error check code included in the additional information; and a decoding unit for decoding the additional information based on the result of error checking;

wherein said error checking unit switches a parameter used in the error checking based on the type of the additional information.

38. A video signal processing apparatus for processing a video signal including additional information with an error check code, comprising:

an input unit for inputting the video signal;

a timing detector for detecting the timing of extracting the additional information from the video signal;

an extraction unit for, in response to the timing detected by said timing detector, extracting the additional information from the video signal;

an error checking unit for checking the additional information using the error check code included in the additional information;

a decoding unit for decoding the additional information based on the result of error checking; and a processing unit for processing the video signal in accordance with the additional information, wherein said error checking unit switches a parameter used in the error checking based on the type of the additional information.

39. A recording medium for recording a video signal, wherein said video signal includes a vertical blanking interval (VBI) signal inserted therein, said VBI signal including additional information with an error check code generated by applying a parameter based on the type of said additional information.

40. A recording medium according to claim 39, wherein said additional information includes copy management information.

41. A recording medium according to claim 39, wherein the type of additional information is determined on the basis of bit assignment within a predetermined bit range of the additional information.

42. A recording medium according to claim 39, wherein said error check code is a Cyclic Redundancy Check Code (CRCC).

43. A recording medium according to claim 39, wherein when the additional information is of a predetermined type, the error check code is generated by applying the parameter which is common among two or more signal transmission methods.

44. A recording medium according to claim 39, wherein said parameter associated with the error check code is an initial value used in the generation of the error check code.

45. A recording medium according to claim 39, wherein said parameter associated with the error check code is a formula for generating the error check code or is a shift register configuration implementing said formula.

* * * * *